May 12, 1936.   C. H. COOLIDGE   2,040,295
CLOTH SHEARING MACHINE
Filed Jan. 31, 1935
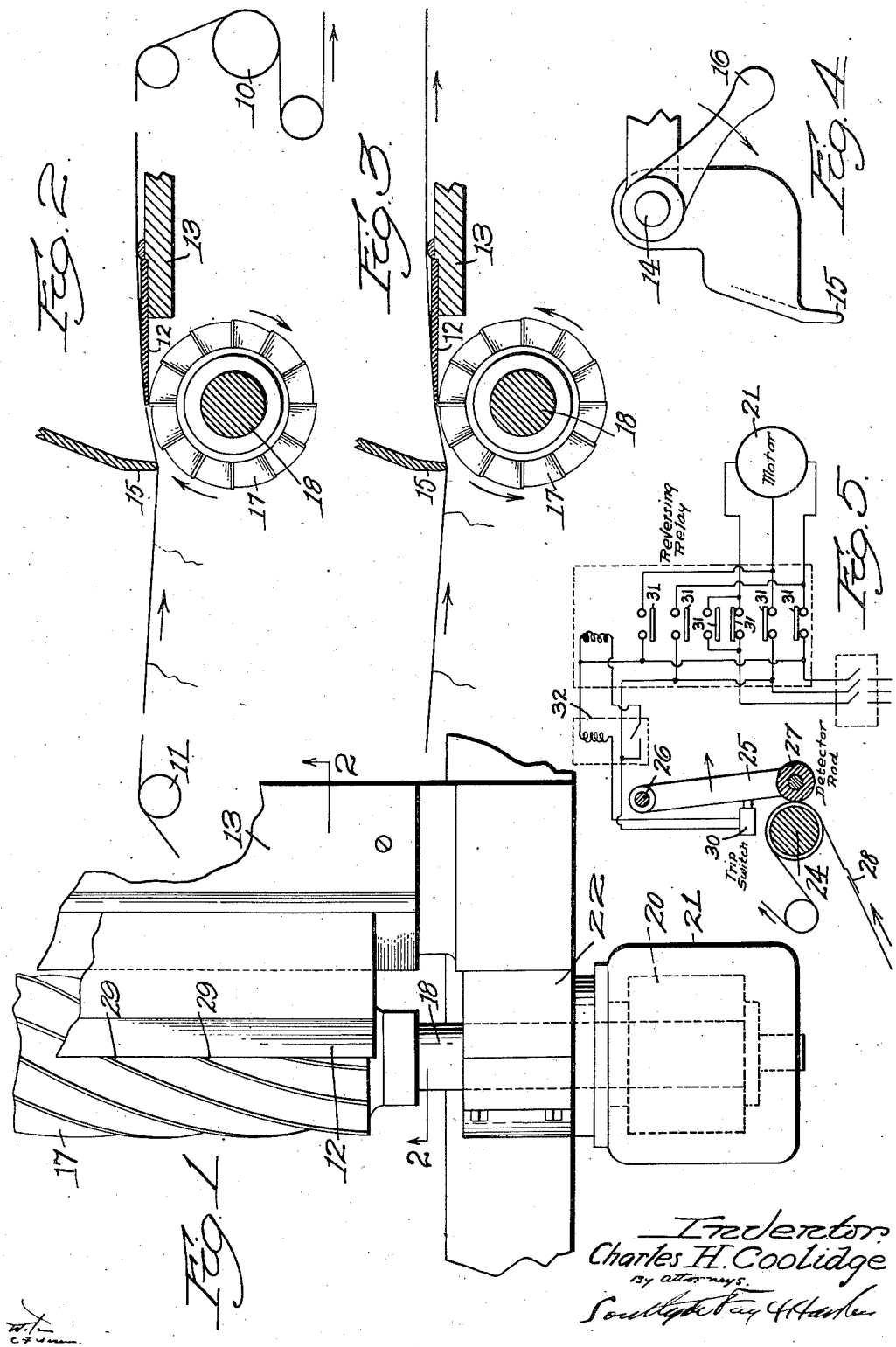
Inventor
Charles H. Coolidge
by attorneys Patented May 12, 1936

2,040,295

UNITED STATES PATENT OFFICE 2,040,295

CLOTH SHEARING MACHINE

Charles H. Coolidge, Worcester, Mass., assignor to Curtis & Marble Machine Company, Worcester, Mass., a corporation of Massachusetts Application January 31, 1935, Serial No. 4,347

18 Claims. (Cl. 26—17)

This invention relates to a machine for shearing one or both faces of the cloth as it runs through the machine.

The principal objects of the invention are to provide means for interrupting the shearing action, whenever a seam or projection passes through the machine, without the necessity of moving any heavy part, such as the usual bridge or protecting means for the cloth, or even of moving any mechanism connected with operating such a bridge; to provide means whereby when the projection of the cloth passes a certain point, means will be set into operation which will stop the shearing action and protect the cloth against being caught in the shear, without releasing in any degree the tension on the cloth or changing its position in the machine; to provide electrical means operated by a detector for reversing the driving means of the revoluble cutter for the above-mentioned purpose; to provide for interrupting the cutting action in such a way as to avoid any damage to the cloth, and to provide an arrangement by which the interruption to the shearing operation will have as short a duration as possible.

Other objects and advantages of the invention will appear hereinafter.

Reference is to be had to the accompanying drawing, in which

Fig. 1 is a plan of a part of a cloth shearing machine showing a preferred embodiment of this invention;

Fig. 2 is a sectional view on the line 2—2 of Fig. 1 showing the cutter running in its usual manner to shear off threads and projections on one side of the cloth;

Fig. 3 is a similar view showing the cutter reversed and the cloth passing through the machine the same as in Fig. 2 without any change in the path of the cloth or any danger of catching the cloth in the rotary cutter;

Fig. 4 is an end view of the rest which bears on the cloth to hold it in the right position, and Fig. 5 is a wiring diagram.

With the increase of the speed with which cloth is fed through cloth shearing machines at the present day, it has become necessary to provide a much more rapid sequence of operations of the protecting means than has been the case heretofore. Cloth now often attains a speed of fifty inches per second. It is desirable, of course, that as small a portion of the surface of the cloth as possible shall remain unsheared. In other words, the cutting element must operate as such with as little interruption as possible.

Previous protecting means have been of such a nature, so far as I am aware, that to become operative for interrupting the shearing, heavy elements and complicated assemblies of elements had to be moved. The movement of such elements into protective condition and then into non-acting condition, to permit the shearing to be renewed, has required the use of additional mechanical or electric power. According to this invention, the ordinary elements of a cloth shearing machine are employed, the cloth being supported while it is being sheared. By the present invention, the elements essential to the shearing of the cloth in themselves constitute the means for interrupting the shearing and the means for preventing damage to the cloth. Thus all these support moving mechanisms are eliminated.

According to this invention, another very important condition is obtained. In operation the cloth is drawn taut over the usual supporting elements by which it is maintained in shearing position. This taut condition is not disturbed by the present invention as it has been by all previous devices for similar purposes. Disturbance of the path of the cloth causes a slackness of the cloth at the instant and the necessity of the introduction of compensating devices to maintain the taut condition. In the present invention the path of the cloth is once established in correct shearing position and not allowed to get out of its condition of tautness, thus eliminating the possibility of the cloth, in slack condition, being injured by the rotary cutting element of the shearing means. The rotary cutting element itself is operated in such a way as to prevent damage to the cloth.

Referring to the drawing, the cloth of course travels to the draft roll 10 from the front carrier 11 as is usual and at each shearing station it passes over or under a blade 12 mounted on the back 13. Also mounted on the frame is a shaft 14 carrying a rest 15 which engages the cloth on the side opposite the blade 12. In this case this rest once being put in position, remains there through the cutting operation and the handle 16 on the shaft 14 is used only in case of emergency or to swing the rest away from the cloth for the purpose of threading in.

The blade 12 of course is an element of the shearing device, the other element consisting of a revoluble cutter 17 fixed on the cutter shaft 18. When this cutter rotates in the direction of the arrow in Fig. 2, the cloth is sheared on one side. In this case the shaft 18 has an extension having rigidly fixed thereon the rotor 20 or rotating unit of a reversible motor 21. The casing 21 of the motor is secured to the housing of the revoluble unit bearing 22. This motor can be reversed in an extremely short period of time and obviously when the motor is reversed, the cutter will rotate in the direction of the arrows in Fig. 3 and will not cut so that the cloth will pass through with no shearing action. This, as will be explained below, is not only a non-cutting operation, but a cloth protecting action. The cutter illustrated is the usual helical bladed cutter.

The device of course is used with a detector which is shown in the form of a roll 24 over which the cloth passes on its way to the draft roll 10. A frame 25 is pivoted on a shaft 26 at an elevation and it is provided with a detector rod 27 free to rotate on a shaft carried by the frame. This frame hangs by gravity so that the rod 27 will bear against the roll 24, or the cloth thereon, and the pivot point of the frame, that is the axis of the shaft 26, is located at such a point above the two members 24 and 27 that gravity will hold the detector rod 27 in the position just described. Whenever a projection as 28 on the cloth, whether it is a seam or any other serious projection, engages the detector rod 27 at the high speed that has been mentioned, this rod is suddenly forced outwardly to the right in Fig. 5 and closes a trip switch 30. This sets up a current in the wiring as shown which shifts a series of contacts 31 from the position shown, in which they feed the motor to rotate it in a forward direction, to an opposite position in which the current is brought to the motor through the three upper contacts 31 and reverses the motor, as is well understood in the electrical art. The motor could be stopped and the cutting action interrupted but in this case the curved cutter blades at 29 would be able to catch any slight projection on the cloth, as can be understood from an inspection of Fig. 1, and perhaps injure the cloth. For that reason the motor is reversed and the cloth thereby protected. The protection due to the reversal of the cutter is a very important feature. Of course as soon as the obstruction has passed, the detector rod drops back and the trip switch is again opened and the reversing relay 31 restores the motor to its forward acting condition. This motor preferably runs at a normal speed of about 1100 R. P. M. on an ordinary size machine and is capable of reversing in less than one-third of a second, thus materially reducing the amount of cloth that passes through the machine unsheared.

The sequence of operations will be as follows. The cutting element is placed in operation by starting the motor, the detector rod controls the swich 30 to reverse the motor. This is accomplished through an operator 32 of any desired character to delay the reversal until just before the seam 28 reaches the cutter. When a projection or seam 28 passes by the detector and the detector drops back, the switch 30 is opened again and, through the reversing relay 31, causes the motor to immediately operate in its normal forward shearing direction.

The line of travel of the cloth through the machine, as will be observed, is not disturbed or modified by the reversal of the motor and the reversal of the revoluble cutting element 17. It will be understood that the stationary blade 12 and the individual helical blades which form part of the revoluble unit 17 constitute the cutting element. There may be several cutting units on one machine and usually there are at least two to shear the opposite sides of the cloth.

It will be seen therefore that the cloth is maintained in the same position during reversals of the cutter 17; that the cutter is reversed to protect the cloth against being drawn into the angular space between the edge of the blade 12 and the blades on the revoluble cutter, and that the rest is not moved, thus reducing the power to operate the machine and the repairs as well as the expense for the means for moving it.

This invention is not confined to the specific wiring shown, as a different type of motor winding, by which the reversal is obtained in a little different manner, would require a change in the wiring to meet specific conditions, but for reversing motors in common use, the wiring drawing is correct.

Having thus described my invention and the advantages thereof, I do not wish to be limited to the details herein disclosed, otherwise than as set forth in the claims, but what I claim is:—

1. In a cloth shearing machine, the combination of means for guiding the cloth through the machine, a motorized rotary shearing element, and a switch control for operating the motor in the reverse direction to interrupt the shearing action.

2. In a cloth shearing machine, the combination of means for guiding the cloth through the machine, a rotary shearing cutter, a shaft on which the cutter is mounted, means for rotating said shaft to rotate the cutter in cutting direction, and means for reversing the rotation of said rotating means to interrupt the shearing action.

3. In a cloth shearing machine, the combination of means for guiding the cloth through the machine, a rotary shearing element, means for rotating said element in the cutting direction, and means for reversing the rotation of said element to interrupt the shearing action and protect the cloth against damage from the cutter.

4. In a cloth shearing machine, the combination of a rotary shearing cutter, means for rotating the cutter in the cutting direction, and means for interrupting the shearing action of the cutter by reversing the rotation of said rotating means.

5. In a cloth shearing machine, the combination of a reversible rotary shearing cutter, means for rotating the cutter in the cutting direction and means for protecting seams in the cloth from said cutter upon interruption of the cutting action by reversing the direction of rotation of said rotating means.

6. In a cloth shearing machine, the combination of means for guiding the cloth and maintaining the path of the cloth constant, a rotary shearing device, means for rotating the shearing device in cutting direction and means for reversing the rotating means to interrupt the shearing action while the cloth is passing along its path in taut condition.

7. In a cloth shearing machine, the combination of means for guiding the cloth and maintaining the path of the cloth constant, a rotary shearing device, means for rotating the shearing device in cutting direction, and means for reversing the rotating means to interrupt the shearing action while the cloth is passing along its path in taut condition and for operating the shearing device to resume its shearing action while the cloth still continues running in the same path in taut condition.

8. In a cloth shearing machine, the combination of a support to back up the cloth running through the machine and keep the cloth in a taut condition, a rotary shearing element for shearing the cloth, means for rotating the shearing element in cutting direction, and means for reversing the rotating means while the cloth is running and while said support remains stationary and preventing damage to the running cloth during the interruption.

9. In a cloth shearing machine, the combination of a rotary cutting element, means for maintaining the cloth in a taut condition constantly in position to be sheared by said cutting element, means for rotating the cutting element in cutting direction, and means for reversing said rotating means for preventing damage to the cloth by the cutting element while the shearing is interrupted.

10. In a cloth shearing machine, the combination of a rotatable cutting element, an electric reversible motor having a rotor fixedly and axially connected with said cutter, and means for automatically controlling the cutting rotation and reversal of said rotor and cutter.

11. In a cloth shearing machine, the combination of a rotary cutter, a shaft on which the cutter is mounted, a reversible motor, the shaft being rotatable with and by the motor, a detector adapted to be moved by a projection on the cloth, a trip switch operated by the detector, and means connected with the trip switch for reversing the motor after the detector moves, to interrupt the cutting action and protect the cloth against damage from the cutter.

12. In a cloth shearing machine, the combination of a rotary cutter, a shaft on which the cutter is mounted, a reversible motor mounted on said shaft, a detector adapted to be moved by a projection on the cloth, a trip switch operated by the detector, and means connected with the trip switch for reversing the motor after the detector moves, to interrupt the cutting action and protect the cloth against damage from the cutter, said detector being arranged to return to normal position by gravity and operate the switch to cause the motor to rotate in a cutting direction.

13. In a cloth shearing machine, the combination of a rotary cutting element, power producing means for producing the rotative activity of the cutting element, said power productive means being rotatable with said rotative element, a seam detecting element, and means actuated by said detecting element to obtain a momentary interruption of rotation of the rotative means, a reversal of direction of rotation of the rotative unit, a momentary interruption of this reverse direction of rotation and a resumption of direction of rotation in the initial direction.

14. In a cloth shearing machine, the combination of a rotative producing power unit and means actuated by the detection of a seam or irregularity in the surface of the cloth being treated for interrupting the shearing action by deenergizing the rotative producing power unit, to produce a non shearing condition of the shearing element, and energizing said unit to cause it to rotate in the opposite direction deenergizing the power producing unit and again energizing the power producing unit to obtain a return of the power producing unit to shearing condition.

15. In combination with a cutting or shearing element of a cloth shearing machine comprising a rotatable element and a stationary blade, of means for controlling the rotation or non-rotation of the rotatable unit of the cutting element in a sequence of operations including a rotation of the rotatable unit such that in connection with its contact with the stationary blade in a direction it becomes a cutting operation, a momentary stopping of said rotation, a rotation of the rotatable unit in a direction contrary to the cutting operation and thus presenting a protecting or damage preventing condition of the previous cutting element, a momentary interruption of this reverse direction of rotation of the rotatable unit, and a resumption of rotation of the rotatable unit in the initial or shearing direction of rotation.

16. In a cloth shearing machine, the combination of means for guiding the cloth through the machine, a rotary shearing cutter, a shaft on which the cutter is mounted, means for rotating said shaft to rotate said cutter, and means for controlling the direction of rotation of said means.

17. In a cloth shearing machine, the combination of means for guiding the cloth through the machine, a stationary shearing blade in contact with which the cloth passes, a rotatable unit in position for acting with said stationary blade, means for rotating said rotatable unit to form a cutting element, means for constantly engaging the cloth to hold it in proper relation to the shearing elements, and means for reversing the rotating means to interrupt the shearing action and protect the cloth from being damaged.

18. In a cloth shearing machine, the combination of means for guiding the cloth through the machine, said means comprising a rest engaging the cloth, a stationary shearing blade on the opposite side of the cloth from the rest, a rotatable unit in position for acting with said stationary blade, means for rotating said rotatable unit to form a cutting element, means for reversing the rotating means to interrupt the shearing action, and means for maintaining the path of the cloth constant and keeping it taut while the rotatable unit is operating in each direction.

CHARLES H. COOLIDGE.